United States Patent [19]

Soecknick

[11] 4,212,171

[45] Jul. 15, 1980

[54] DEVICE IN THE FORM OF A DOUBLE-WALLED PIPE FOR COOLING CONTINUOUS PROFILES

[75] Inventor: Erhard Soecknick, Düsseldorf, Fed. Rep. of Germany

[73] Assignee: Messer Griesheim GmbH, Frankfurt am Main, Fed. Rep. of Germany

[21] Appl. No.: 947,343

[22] Filed: Oct. 2, 1978

[30] Foreign Application Priority Data

Oct. 8, 1977 [DE] Fed. Rep. of Germany ... 7731245[U]

[51] Int. Cl.² ............................................. F25D 13/06
[52] U.S. Cl. ......................................... 62/63; 62/378; 264/28; 264/348
[58] Field of Search ................. 62/62, 63, 380, 514 R, 62/378; 264/28, 348

[56] References Cited

U.S. PATENT DOCUMENTS

| 2,015,167 | 9/1935 | Varney | 62/63 |
| 2,494,296 | 1/1950 | Gunther et al. | 62/63 |
| 2,534,334 | 12/1950 | Ahlstrand | 62/63 |

*Primary Examiner*—Ronald C. Capossela
*Attorney, Agent, or Firm*—Connolly and Hutz

[57] ABSTRACT

A device in the form of a double-walled pipe for cooling continuous profiles includes a core pipe of a cross section corresponding to the profile being cooled and which is interchangeably inserted in a jacket pipe with at least one low-boiling liquified gas injection orifice in the core pipe near the intake opening for feeding vaporized gas into the cavity formed by the core pipe and the continuous profile.

7 Claims, 2 Drawing Figures

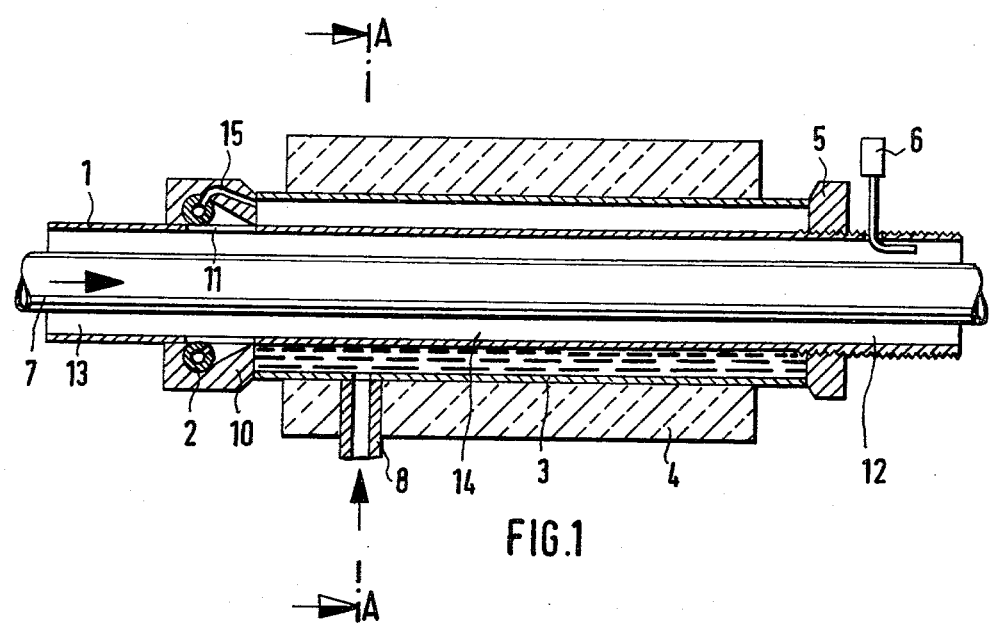
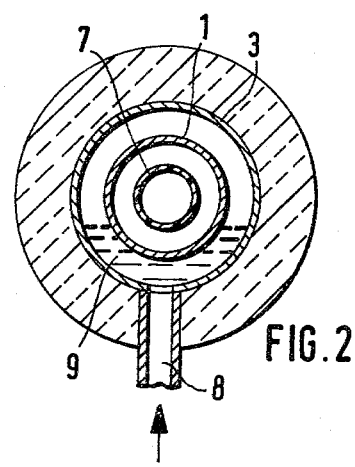

DEVICE IN THE FORM OF A DOUBLE-WALLED PIPE FOR COOLING CONTINUOUS PROFILES

BACKGROUND OF INVENTION

The invention concerns a device in the form of a double-walled pipe for cooling continuous profiles, in which the cavity formed by the core pipe and the jacket pipe is equipped with connections for the inlet of a low-boiling, liquefied gas and the outlet of the vaporized gas.

Continuous profiles, e.g. hose cores or weather stripping for automobile doors, often have to be cooled immediately after their manufacture. The cooling is done in tubular devices, through which the profiles are passed. There they can be sprayed directly with a liquid coolant, e.g. liquid nitrogen. The tubular device can also have a double-walled construction, however. Hereby the liquid coolant is fed into the cavity of the double-walled pipe and forms there, for example, a bath of liquid nitrogen. The vaporized, but still cold, coolant is usually fed into the cavity formed by the inner pipe and the continuous profile which is passed along inside the inner pipe. In this manner the coolant contributes to the cooling of the profile. The invention refers to the type of device described last.

Cooling pipes of this type have a relatively high coolant consumption, since the coldness of the vaporized coolant is utilized only insufficiently. One reason for this is, above all, too low a gas velocity in the cavity formed by the continuous profile and the inner pipe. The inner pipe namely has such a large diameter that, if necessary, even profiles with the largest cross-sectional areas can be moved through the inner pipe. If then profiles with smaller cross sections are moved through the inner pipe, a large, free cross-sectional area remains, in which only a moderate gas velocity can be developed. This disadvantageous effect is intensified even more by the fact that a profile with a smaller cross section also has a lower cold requirement than a profile with a large cross section. Therefore, correspondingly less coolant vaporizes, so that a smaller quantity of gas flows through an enlarged cross section.

SUMMARY OF INVENTION

The task of the invention is therefore to improve a device in the form of a double-walled pipe for cooling continuous profiles, in which the cavity formed by core pipe and jacket pipe is equipped with connections for the inlet of a low-boiling, liquefied gas and the outlet of a vaporized gas, so that the cold content of the vaporized gas can be utilized uniformly well, independently of the cross section of the respective continuous profile.

According to the invention this improvement is realized in that the core pipe has a cross section fitted to the cross section of the continuous profile which is to be cooled, and is inserted interchangeably into the jacket pipe, and has as well at least one injection orifice near the intake opening for the feeding of the vaporized gas into the cavity formed by the core pipe and the continuous profile.

In an advantageous embodiment of the device according to the invention, blast nozzles are attached to the injection orifices for the inlet of the vaporized gas, the blast direction of which is adjustable from the exterior. The blast nozzles can be adjusted in such a way that the vaporized gas escapes only through the outlet opening of the cooling pipe. This means, practically, a doubling of the gas velocity with a corresponding improvement of the convective heat transfer.

Through the fitting of the cross section of the core pipe to the cross section of the continuous profile which is to be cooled, it is possible to keep the cross section of the flow channel formed by core pipe and continuous profile small, thus a correspondently good convective heat transfer is obtained. The interchangeability of the core pipe makes it possible to use a core pipe which conforms with the respective profile cross section, whereby a uniformly high gas velocity is guaranteed with a wide range of profiles.

THE DRAWINGS

FIG. 1 is a longitudinal section through the device of this invention; and

FIG. 2 is a cross section along the line A—A of FIG. 1.

DETAILED DESCRIPTION

The device illustrated in FIGS. 1 and 2 consists of a core pipe (1) which is placed in the jacket pipe (3) with the formation of a cavity therebetween. The jacket pipe (3) is equipped with insulation (4). Jacket pipe has in addition a supply line (8) for the coolant, liquid nitrogen. In the cavity between core pipe (1) and jacket pipe (3) a bath (9) of liquid nitrogen is formed. Furthermore, the core pipe (1) is joined securely with the nozzle adjustment head, in which the blast nozzles (2) are arranged. The injection orifices (11) are arranged in the core pipe (1) below the nozzle adjustment head (10). By means of the nozzle adjustment head (10) the blast direction of the blast nozzles (2) can be so regulated that the vaporized gaseous coolant finally exists from the outlet opening (12) of the cooling pipe, yet no air is sucked through the intake opening (13). The cross section of the core pipe (1) is fitted to the cross section of the continuous profile which is to be cooled, in this case of a hose core (7), in such a way that an optimum gas velocity is generated in the flow channel (14) formed by the hose core (7) and the core pipe (1). Hereby an exceptional convective heat transfer can be obtained. On the outlet side of the cooling pipe, the core pipe (1) is secured with a nut (5). The flow channel (14) is connected with the blast nozzles (2) through the conduit (15). By loosening the nut (5), the core pipe (1) with the nozzle adjustment head (10) can be pulled out and replaced by another. Thereby a good degree of fullness can be obtained for each continuous profile. By degree of fullness is meant the relationship of the cross section of the profile to that of the core pipe. In order to obtain good effeciency for the utilization of the coldness of the vaporized coolant the degree of fullness should be between 0.7 to 0.9.

The cooling temperature of the hose core (7) is controlled with a thermal sensor (6), which regulates the inlet of the liquid nitrogen in actual—theoretical value ratio through a regulator which is not shown in the drawing. In this way the thermal sensor (6) measures the gas temperature, which is strongly interrelated with the temperature of the hose core (7). If a high cooling temperature is required, then a corresponding gas temperature is selected at the measuring point using the regulator. The supply of liquid nitrogen in the cavity between jacket pipe and core pipe corresponds with the selected gas temperature. A solenoid valve is used as the control element for the inlet of the liquid nitrogen.

The length of the cooling pipe depends on the cooling temperature differential of the continuous profile to be cooled.

The specific consumption of liquid nitrogen is extraordinarily low in the cooling pipe according to the invention, since an exceptional utilization of the gas coldness ensues. The efficiency is more than 90%.

What is claimed is:

1. In a device in the form of a double-walled pipe for the cooling of continuous profiles, in which a space formed between the core pipe and the jacket pipe is equipped with connections for the inlet of a low-boiling, liquefied gas and the outlet of the vaporized gas, the improvement being said core pipe having a cross section which is fitted to the cross section of the continuous profile which is to be cooled, mounting means detachably mounting said core pipe into said jacket pipe whereby said core pipe may be replaced by a different core pipe in accordance with the cross section of the profile being cooled, and at least one injection orifice in said core pipe near the profile intake opening for the feeding of the vaporized gas into the space formed between said core pipe and the continuous profile.

2. Device according to claim 1, characterized thereby that blast nozzles are attached to said injection orifices, and means for adjusting the blast direction of said blast nozzles from the exterior.

3. Device according to claim 1, characterized thereby that said space between said core pipe and said jacket pipe is closed at its end near said intake opening by a head having a conduit leading from said space to the interior of said head, discharge nozzles in said interior of said head communicating with said conduit whereby the gas may flow into said nozzles, and said discharge nozzles having outlets directed toward at least one injection orifice in said core pipe.

4. Device according to claim 3, characterized thereby that said mounting means includes a nut movably mounted on said core pipe and abutting against said jacket pipe to close said end of said space between said core pipe and said jacket pipe remote from said intake opening.

5. In a method of cooling continuous profiles which pass through a core pipe with a jacket pipe around and spaced from the core pipe and with low-boiling liquefied gas being fed into the space, the improvement being detachably mounting to the jacket pipe a core pipe which has a cross section conforming to the cross section of the profile whereby a different core pipe may be used with a different cross section profile, and discharging the vaporized gas through at least one injection orifice in the core pipe and into the interior of the core pipe between the core pipe and the profile at the upstream end of the core pipe with respect to the direction of movement of the profile.

6. In the method of claim 5, characterized thereby in closing one end of the space between the core pipe and the jacket pipe by head having a conduit leading from the space to the interior of the head, passing the vaporized gas through the conduit into nozzles in the head, and discharging the vaporized gas from the nozzles into at least one injection orifice.

7. In the method of claim 6, characterized thereby in movably mounting a nut on the core pipe until the nut contacts the jacket pipe to close the end of the space opposite the head.

* * * * *